Patented Feb. 9, 1937

2,069,787

UNITED STATES PATENT OFFICE 2,069,787

THIN FLEXIBLE FILM COMPOSITION

Peter A. van der Meulen, New Brunswick, N. J., assignor to John R. Ditmars, New Brunswick, N. J.

No Drawing. Application July 18, 1933, Serial No. 680,975

16 Claims. (Cl. 106—38)

This invention relates to a transparent sheet material and comprehends a substantially moisture-impervious material.

In the copending application of Charles M. Boyce, Serial No. 545,833, filed June 20, 1931, Patent 1,978,406 for treating surfaces of fibrous materials, there is disclosed a film forming composition which is capable of being formed into a transparent sheet and which is also suitable for a film coating for coating the surface of materials. In one form the composition contains gelatin and a glycerine phthalate ester. This composition, when drawn out into a film to form a sheet or a coating for a sheet base, is transparent. The surface of the dried coating or film may be polished to a high gloss and it is extremely flexible. Under ordinary conditions the surface of the film is very smooth and non-tacky but under certain atmospheric conditions, that is, a high humidity and high temperature, the composition takes up moisture and becomes sticky and under extreme conditions it may become soggy.

By this invention a sheet of this nature may be produced which has all of the desirable physical properties of the sheet disclosed in the aforementioned Boyce application, that is, it is transparent; it may be polished to a high gloss; and it is extremely flexible, and in addition a sheet made in accordance with this invention is substantially impervious to moisture and oil. In accordance with the invention, there is added to a film forming composition a practically insoluble compound. The compound is added to the film forming composition under circumstances to produce a suspension therein in a fine state of dispersion throughout the composition. In a gelatin film forming composition such as that described in the aforementioned Boyce application, the insoluble compound used for the purpose of making the composition impervious to moisture is a compound resulting from the reaction between a sulphonated oil such as sulphonated castor oil, olive oil, etc., and a water-soluble salt of a metal belonging to any of the groups of the periodic system except group 1. In making the gelatin composition, the gelatin is swelled in water and a small quantity of acetic acid is added. A water-soluble metallic salt, of the above mentioned group, is then added to this gelatin mixture and dissolved therein. There is then added to the solution a sulphonated oil. The sulphonated oil and the soluble metallic salt react to produce an indefinite compound of the metal and the sulphonated oil which is virtually insoluble and to release the free oil in the sulphonated oil mass in an extremely fine state of dispersion throughout the gelatin mixture. In the presence of the gelatin the insoluble compound is also produced in an exceedingly fine state of dispersion and does not come out as a coalescing precipitate as in the case where the gelatin is absent. It is believed that the gelatin, in the finished form, forms a sponge-like structure. The insoluble sulphonated oil compound fills the interstices of this sponge-like structure and the free oil released by virtue of the reaction between the sulphonated oil and the metal salt coats the gelatin structure. The oil protects the structure of the gelatin from moisture and the insoluble compound in the interstices of the sponge-like structure prevents the moisture from penetrating into or through the composition.

A film forming composition embodying this invention can be made up in accordance with the following example which will serve to illustrate the proportions of the various ingredients and the procedure followed. For a small quantity of the film forming composition, 32 gms. of gelatin is swelled by letting the gelatin soak in 180 cc. of water for a period of twelve hours. The swelled gelatin is heated in a water bath to 120° F. and while in a liquid state, 1 cc. of 50% acetic acid is added. At this time, a solution of calcium nitrate is added. The solution of calcium nitrate is made up by dissolving crystallized calcium nitrate in water. The quantities of water and nitrate used are adapted to produce a solution of 1 gram mole per liter. Other suitable salts of the alkaline earths, such as calcium chloride, calcium acetate, and similar barium salts, may be used.

As heretofore stated, these soluble salts of the alkaline earths are used for reacting with a sulphonated oil which is added to the mixture after the addition of the solution of calcium nitrate. In the case being described, 14 cc. of molar calcium nitrate solution would be added to the gelatin-acetic acid mixture. In any solution, the proper amount of the calcium nitrate solution to be added can be determined in the following manner: 22 gms. of the sulphonated and neutralized castor oil, hereinafter more particularly described, is diluted with about 50 cc. of water in a small Erlenmeyer flask, provided with a cork. The calcium nitrate solution is placed in a burette and added to the solution of the sulphonated oil, one-half cc. at a time. The flask is shaken vigorously after each addition of calcium salt solution, to cause foaming. It will be found that the addition of approximately 15 cc. of the calcium salt solution will practically stop all foaming. This volume is read accurately and represents a measure of the calcium solution necessary to precipitate completely the sulphonated oil. From 90 to 95% of this quantity of calcium nitrate solution is then added in the coating solution.

The next step is the addition of the sulphonated oil. The substance here designated as sulphonated oil is a sodium neutralized sulphonated oil; for the purpose of the composition being described it is the sodium-neutralized product of the reaction of 30% by weight of concentrated sulphuric acid (O. V.) and 70% by weight of castor oil. The reaction is carried out at a temperature below 35° C., and requires approximately five hours. Such a sulphonated mass contains about 8.5% combined sulphur-trioxide $SO_3$. This product is treated with an equal quantity of water, thoroughly stirred, and allowed to settle. The water is then drawn off. The oil is then neutralized with the proper quantity of caustic soda, 32° Bé. Any other sulphonated oil such as olive oil is suitable for the purpose, but a sulphonated castor oil is preferred.

In the example being given, 22 gms. of the sulphonated mass is added to 20 cc. of water and the mixture is added to the gelatin mixture. The result of the addition of the sulphonated mass is the production in the mixture of the insoluble calcium salts and also of the separation of the free castor oil in the sulphonated oil, in an extremely fine state of dispersion throughout the gelatin. The gelatin, and a small quantity of the remaining sodium salt of sulphonated oil act as protective colloids to maintain the fine state of division of the oil and calcium salts. The same result can be obtained from the reaction of the sodium neutralized sulphonated oil with a soluble salt of any of the following metals: strontium, barium, zinc, cadmium, mercury, lead, aluminum, glucinum, tin, bismuth, etc.

After the sulphonated mass has been added, the following are added successively: a mixture of 150 cc. of water and 7 cc. of butyl alcohol, a mixture of 1.25 cc. of ammonia, 4.25 cc. of a 5% solution of phenol in water, and 20 cc. of water, a mixture of 2.5 cc. of a 40% solution of formaldehyde and 45 cc. of water, and 100 cc. of water. The butyl alcohol apparently serves two functions. During the coating process, it lowers the surface tension of the water and thus promotes a spreading of the composition; it also aids in tying the film to a paper when used as a coating, acting as an additional bonding link between the paper and the coated film. Any one of the three isomers of butyl alcohol, primary, secondary or tertiary or mixture of these, may be used.

The formaldehyde serves to harden the gelatin; it is not an essential ingredient and can be dispensed with. However, the small quantity of formaldehyde mentioned seems to produce a firmer film which has less tendency to squeeze in the process of smoothing the surface of the film.

The phenol (carbolic acid, U. S. P.) is simply a preservative. Beta naphthol or any other good preservative, which will prevent bacterial growth, may be substituted for the phenol.

Any other suitable soluble organic acid can be substituted for the acetic acid. The acetic acid is merely used to assist in the action of the water on the gelatin.

It has been found that the clearness and resistance to penetration by moisture are appreciably increased by using a sulphonated castor oil which has been freed as nearly as possible from inorganic salts (especially sodium sulphate). The sulphonated oil can readily be freed from these soluble salts by making a solution of the sulphonated oil with an equal volume of acetone, letting the solution stand over night to allow the salts to crystallize, and then filtering to remove the salts after which the acetone may be evaporated.

When the film forming composition is made as described above, certain soluble salts are produced in the double decomposition such, for example, as sodium nitrate. While these soluble salts are undesirable it is quite probable that they are immaterial in the small quantities in which they are present in the film forming coating composition. The production of these soluble salts may, however, be reduced to a minimum in the preparation of the film forming composition by following the method described below. This latter method is also less expensive than the former and it involves materials which are less costly, and saves the work of certain intermediate steps. As before, 32 gms. of gelatin are soaked in 180 gms. of water for a period of twelve hours. The gelatin is then heated in a water bath to 120° F. and 1 cc. of a 50% acetic acid is added. Thereafter a quantity of calcium oxide, previously slaked in water, not quite sufficient to neutralize the sulphonated mass to be later added, is then added to the mixture.

The amount of calcium oxide to be added may be determined in the following manner: A portion of the sulphonated mass, hereafter described, is weighed and diluted in cold water. The mass is then titrated at once with standard sodium hydroxide solution. From the results of this titration the quantity of calcium oxide necessary for complete neutralization is readily calculated. Between 90 and 95% of the calculated quantity of calcium oxide is weighed out, ground in a mortar, slaked with water and then added to the gelatin which has been warmed to 120° F. In addition, 1 cc. of concentrated ammonium hydroxide is added at this time. To the quantity of water-soaked gelatin described above, the following is added: 1 gram of calcium oxide is added together with 50 cc. of water and 1 cc. of ammonia.

The sulphonated mass referred to immediately above and which is next added to the mixture is the unneutralized product of the reaction of 30% by weight of concentrated sulphuric acid (O. V.) and 70% by weight of castor oil. The reaction is carried out at a temperature below 35° C. and requires approximately five hours. In this method, as in the one previously described, any other sulphonated oil may be used but sulphonated castor oil is preferred.

During the addition of the sulphonated mass, the gelatin solution is stirred vigorously. In the illustrative case, a mixture of 22 gms. of the sulphonated mass and 50 cc. of water are added to the gelatin solution. When the addition of the sulphonated mass is complete, the solution is tested with litmus paper and if necessary it is neutralized. If the solution is found to be acid, ammonia is added to bring it to neutrality; if it is alkaline, acetic acid is added. When the solution has been made neutral, the following mixtures are added successively: 7.5 cc. of butyl alcohol, 4.5 cc. of phenol, 50 cc. of water; 1.25 cc.

of ammonia, 10 cc. of water; and 45 cc. of water, 2.5 cc. of formaldehyde. Finally, there is added 100 cc. of water. The composition so formed is ready to be applied to the paper and should be applied at once.

Strontium hydroxide or barium hydroxide and the like may be substituted for the calcium oxide used in this formula.

The emulsion so formed is readily drawn out into a film by any of the well known methods for forming films and it can be formed into a film on any of the well known machines for forming cellulose films. After the composition is drawn into a film and thoroughly dried it may be polished as by calendering or by pressure contact with a highly polished surface. The film so formed has many uses. Films of this kind having various color effects can readily be made by adding dyes and metallic powders such as the aluminum and bronze powders to the film forming emulsion.

It will be obvious that various changes may be made by those skilled in the art in the details of the procedure in making, and the ingredients of, the embodiment of the invention described above within the scope and principle of the invention as expressed in the appended claims.

I claim:

1. A composition for forming a continuous film comprising a mixture containing a film forming emulsion and a water-insoluble salt of a sulphonated vegetable oil in a fine state of dispersion throughout the emulsion.

2. A composition for forming a continuous film comprising a mixture containing a film forming emulsion and the reaction products of a water-soluble compound of a metal taken from the group consisting of the metals of the second to eighth groups inclusive of the periodic system and a sulphonated vegetable oil in a fine state of dispersion throughout the emulsion.

3. A composition for forming a continuous film comprising a mixture containing a film forming emulsion and the reaction products of a substance taken from the group consisting of strontium hydroxide, barium hydroxide and calcium hydroxide and a sulphonated vegetable oil in a fine state of dispersion throughout the emulsion.

4. A composition for forming a continuous film comprising a mixture containing a film forming emulsion and the products of the reaction between calcium hydroxide and a sulphonated vegetable oil in a fine state of dispersion throughout the emulsion.

5. A composition for forming a continuous film comprising a mixture containing a film forming emulsion and the products of the reaction between calcium hydroxide and sulphonated castor oil in a fine state of dispersion throughout the emulsion.

6. A composition for forming a continuous film comprising a mixture containing a film forming emulsion and the reaction products of a water-soluble salt of a metal taken from the group consisting of the metals of the second to eighth groups inclusive of the periodic system and a sulphonated vegetable oil in a fine state of dispersion throughout the emulsion.

7. A composition for forming a continuous film comprising a mixture containing a film forming emulsion and the reaction products of a water-soluble salt of a metal taken from the group consisting of the metals of the second to eighth groups inclusive of the periodic system and a sodium neutralized sulphonated vegetable oil in a fine state of dispersion throughout the emulsion.

8. A composition for forming a continuous film comprising a mixture containing a film forming emulsion and the reaction products of a water-soluble calcium salt and a sodium neutralized sulphonated castor oil in a fine state of dispersion throughout the emulsion.

9. A thin continuous flexible film comprising a dry moisture-resistant composition including a film forming composition and a water-insoluble salt of a sulphonated vegetable oil in a fine state of dispersion throughout the composition.

10. A thin continuous flexible film comprising a dry moisture-resistant composition including a film forming composition and the reaction products of a water-soluble compound of a metal taken from the group consisting of the metals of the second to eighth groups inclusive of the periodic system and a sulphonated vegetable oil in a fine state of dispersion throughout the composition.

11. A thin continuous flexible film comprising a dry moisture-resistant composition including a film forming composition and the reaction products of a substance taken from the group consisting of strontium hydroxide, barium hydroxide and calcium hydroxide and a sulphonated vegetable oil in a fine state of dispersion throughout the composition.

12. A thin continuous flexible film comprising a dry moisture-resistant composition including a film forming composition and the products of the reaction between calcium hydroxide and sulphonated vegetable oil in a fine state of dispersion throughout the composition.

13. A thin continuous flexible film comprising a dry moisture-resistant composition including a film forming composition and the products of the reaction between calcium hydroxide and a sulphonated castor oil in a fine state of dispersion throughout the composition.

14. A thin continuous flexible film comprising a dry moisture-resistant composition including a film forming composition and the reaction products of a water-soluble salt of a metal taken from the group consisting of the metals of the second to eighth groups inclusive of the periodic system and a sulphonated vegetable oil in a fine state of dispersion throughout the composition.

15. A thin continuous flexible film comprising a dry moisture-resistant composition including a film forming composition and the reaction products of a water-soluble salt of a metal taken from the group consisting of the metals of the second to eighth groups inclusive of the periodic system and a sodium neutralized sulphonated vegetable oil in a fine state of dispersion throughout the composition.

16. A thin continuous flexible film comprising a dry moisture-resistant composition including a film forming composition and the reaction products of a water-soluble calcium salt and a sodium neutralized sulphonated castor oil in a fine state of dispersion throughout the composition.

PETER A. VAN DER MEULEN.